United States Patent [19]
Wittenberg

[11] 4,129,305
[45] Dec. 12, 1978

[54] PHONOGRAPH TURNTABLE ELECTRO-THERMAL CUEING CONTROL

[75] Inventor: Roland C. Wittenberg, New Hyde Park, N.Y.

[73] Assignee: Pickering & Company, Inc., Plainview, N.Y.

[21] Appl. No.: 819,694

[22] Filed: Jul. 28, 1977

Related U.S. Application Data

[63] Continuation of Ser. No. 662,223, Feb. 27, 1976, abandoned.

[51] Int. Cl.$^2$ ............................................. G11B 3/10
[52] U.S. Cl. .................................................. 274/23 R
[58] Field of Search ................... 274/23; 310/306, 307

[56] References Cited

U.S. PATENT DOCUMENTS

| | | | |
|---|---|---|---|
| 2,487,154 | 11/1949 | Lloyd | 310/307 |
| 2,572,162 | 10/1951 | Koonz | 310/306 |
| 2,743,574 | 5/1956 | McCorkle | 310/306 |
| 3,727,922 | 4/1973 | Igata | 274/23 R |
| 3,814,441 | 6/1974 | Craggs | 274/23 R |
| 3,884,481 | 5/1975 | Eisemann | 274/23 R |
| 3,926,440 | 12/1975 | Wren | 274/23 R |

*Primary Examiner*—Richard E. Aegerter
*Assistant Examiner*—John W. Shepperd
*Attorney, Agent, or Firm*—Kane, Dalsimer, Kane, Sullivan and Kurucz

[57] ABSTRACT

A cueing control is provided for a phonograph turntable of the type including a frame, a record supporting disc affixed to the frame and mounted for rotation about a central axis, and a tone arm having a cartridge assembly affixed to one end thereof. The cueing control comprises a post mounted to the frame for vertical movement and having a cradle affixed to its top end designed to underlie portions of the tone arm. The bottom end of the post is engaged by one end of a bimetallic element which, in turn, is cantilevered to the frame. A heater is positioned adjacent to the bimetallic element so that the element can be heated and caused to deflect to thereby shift the post vertically.

3 Claims, 3 Drawing Figures

PHONOGRAPH TURNTABLE ELECTRO-THERMAL CUEING CONTROL

This is a continuation of application Ser. No. 662,223, filed Feb. 27, 1976, now abandoned.

BACKGROUND OF THE INVENTION

The present invention relates to phonograph turntables and more particularly to a cueing device for use with such turntables to permit the remote raising and lowering of the phonograph tone arm.

Many quality phonograph turntables provide a "cueing control" as a desirable feature that protects both the user's cartridge and records. The main purpose of the cueing control is to allow the cartridge to set slowly down onto a record on the turntable by remote control means or a switch. In other words, the cueing control permits a user to position his cartridge over a particular band on a record and then slowly bring the cartridge down into contct with the record thereby avoiding the danger of scratching the record or damaging the cartridge or its stylus tip. The same control or switch may also be used to lift the cartridge from a record in a gentle manner again avoiding the possible danger of scratching the record.

Heretofore, most of the cueing controls commercially available have utilized a viscous damping system in which the motion of the tone arm is slowed by means of a piston and cylinder using either a viscous fluid, such as silicone grease, or an air damped cylinder.

It is the principal object of the present invention to provide an improved, relatively simple and inexpensive cueing device for use with a phonograph turntable.

SUMMARY OF THE INVENTION

The above and other beneficial objects and advantages are attained in accordance with the present invention by providing an electro-thermal cueing device for a phonograph turntable of the type including a frame, a record supporting disc affixed to the frame and mounted for rotation about a central axis, and a tone arm having a cartridge assembly affixed to one end thereof. The cueing control comprises a post mounted to the frame for vertical movement and having a cradle affixed to its top end designed to underlie portions of the tone arm. The bottom end of the post is engaged by one end of a bimetallic element which, in turn, is cantilevered to the frame. A heater is positioned adjacent to the bimetallic element so that the element can be heated and caused to deflect to thereby shift the post vertically. The gradual lifting and lowering action of the cueing device is affected by the time required by the bimetallic element to heat or cool to produce the desired deflection.

BRIEF DESCRIPTION OF THE DRAWINGS

In the accompanying drawings.

DETAILED DESCRIPTION OF THE PREFERRED EMBODIMENTS

Figure 1:
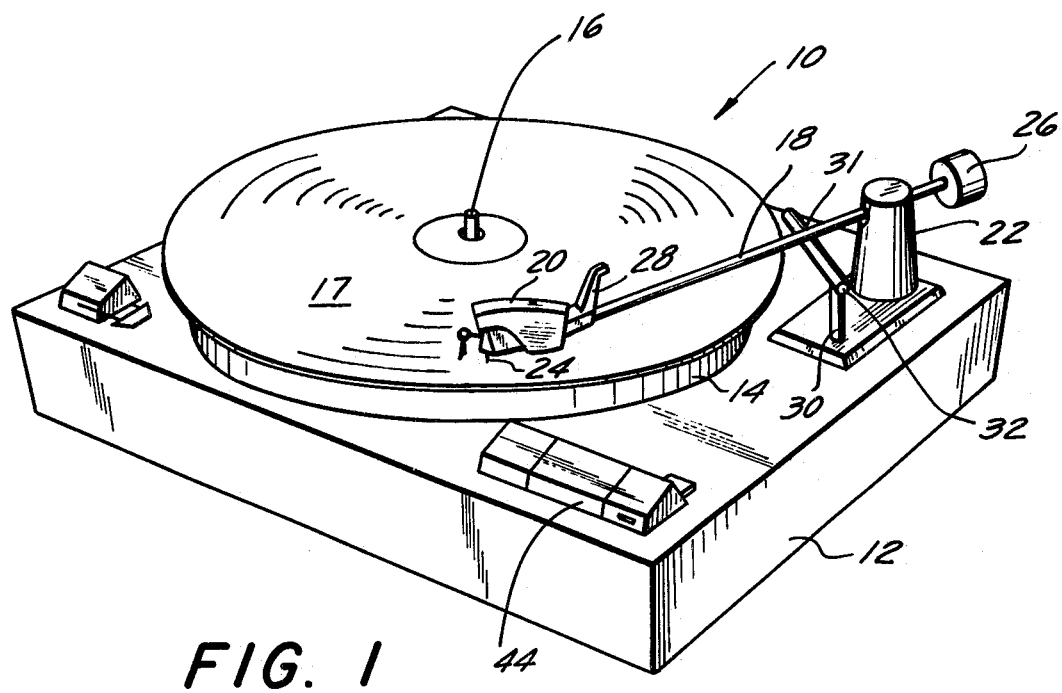
FIG. 1 is a perspective view of a phonograph turntable incorporating the cueing device of the present invention.

Reference is now made to the drawings wherein the present invention is illustrated. In FIG. 1, a turntable 10 is shown comprising a frame or base 12 containing therein a motor and the associated electronics (not shown) to drive a record supporting disc 14. Disc 14 revolves about a central axis or spindle 16 which serves to receive a record 17.

The turntable is provided with a tone arm 18. A cartridge assembly 20 is mounted to one end of the tone arm. A pivotal mounting 22 is provided proximal to the opposite end of the tone arm. Mounting 22 is such as to permit the cartridge 20 to move vertically toward and away from the horizontal plane of disc 14 and arcuately in a plane generally parallel to disc 14 toward and away from the central axis 16.

The cartridge assembly 20 includes a stylus tip 24 designed to track the grooves on record 17. A counterweight 26 may be provided to balance the tracking force. The tone arm is also provided with a handle 28, which, absent a cueing device, would be used by a user of the phonograph to position the stylus 24 on the record or remove the stylus from the record. Anyone familiar with such devices knows that no matter how carefully one tries to handle the tone arm, very often the tone arm slips and scratches the record or perhaps does damage to the cartridge.

In accordance with the present invention, a post 30 is provided mounted to the frame for vertical movement. A horizontally extending cradle 32 is affixed to the top end of the post. The cradle is sufficiently long so that portions of it underlie the tone arm no matter what portion of the record is tracked by stylus 24. That is, a point 31 on the tone arm always rides over a portion of the cradle 32 as the stylus tracks the entire record. The bottom end of post 30 rests on a bimetallic strip 34. Strip 34 is made up of two coextensive lengths of metals having differing coefficients of thermal expansion. The length of material 33 with the higher coefficient is on top of the length of material 35 with the lower coefficient of expansion. As shown, member 34 is cantilevered at one end 36 to frame 12 and the bottom of post 30 is connected to the free end of member 34. In this manner, the post will shift vertically as the bimetallic member deflects. A heater 38 is provided adjacent to the bimetallic member 34. The heater comprises a resistive element connected to a power supply 40 through a switch 42 which, in fact, may comprise one of the controls 44 on the face of the turntable.

Figure 2:
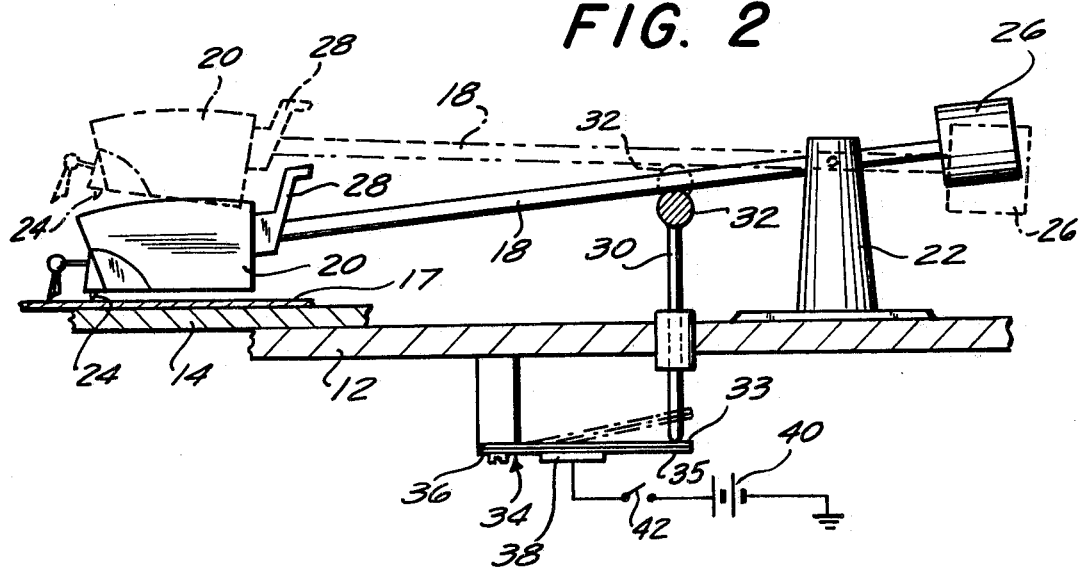
FIG. 2 is a simplified sectional view of the phonograph cueing device; and,
FIG. 3 is a fragmentary enlarged sectional view of a modified cueing device.

In operation, when the heater 38 is activated and heat is applied to the bimetallic member, the member bends out of shape because of the different coefficients of expansion of the two metals. This bending, in turn, raises or lowers the lifting post 30 from a position wherein the post is below the tone arm (and out of contact with it) to a position wherein the post (or more correctly, the post cradle 32) engages the tone arm and lifts it off the record. The two positions are shown respectively in solid line and phantom line in FIG. 2.

With the bimetallic member 34 oriented as described above (i.e., with metal 33 overlying metal 35), the application of heat to the bimetallic member would lower the cueing post and hence enable the cartridge to track a record. When the heat is removed (i.e., when power to the heater is switched off), the bimetallic member will cool off causing the free end of member 34 to deflect upwardly so that the post will rise off the record. By tying the power supply 40 for the cueing device into the main power supply for the turntable, the cartridge will automatically lift off a record when the turntable is turned off.

Figure 3:
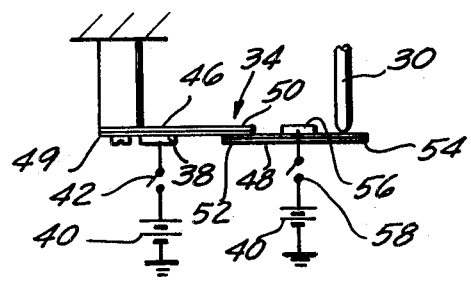

In FIG. 3, a slightly modified embodiment of the present invention is disclosed. In this modified design, the bimetallic member 34 comprises a first bimetallic element 46 and second bimetallic element 48 of approximately equal lengths and formed of the same materials. One end 49 of element 46 is secured to the frame 12 as before. The opposite end 50 of element 46 is bonded to one end 52 of element 48. The cueing post 30 is mounted to the free end 54 of element 48. It is to be noted that the components of bimetallic element 48 are oriented opposite to the orientation of the components of bimetallic element 46. That is, in element 46 the length of material with the higher coefficient of expansion is on top of the length of material with the lower coefficient of expansion. The opposite is true for element 48. In this manner, any ambient temperature change within the base is automatically compensated for since the deflection of elements 46 and 48 will be opposite to each other and hence tend to cancel each other out.

Heater 38 is positioned adjacent element 46 so that when switch 42 is closed and the bimetallic member heated, the end 50 (along with element 48 and post 30) will move downwardly. When switch 42 is opened and the heater 38 permitted to cool, end 50 will deflect upwardly carrying with it member 48 and post 30.

Since the return of the tone arm to the raised position relies on cooling of the bimetallic member, its response may be too slow. In order to increase the speed at which the cueing post raises the tone arm, an auxiliary heater 56 is provided. Heater 56 comprises a resistive element connected to the power supply through a switch 58 which is designed to close momentarily when switch 42 is opened and thereafter open.

Thus, when switch 42 is opened so as to permit heater 38 to cool (and hence permit member 46 to deflect upwardly) switch 58 closes momentarily to activate heater 56 and thereby rapidly deflect element 48 upwardly. The resistance of heaters 38 and 56 and the power applied to them determine the speed at which the tone arm raises and lowers.

The bimetallic elements 46 and 48 are bonded together with suitable heat insulation means to minimize the effects of heaters 38 and 56 on bimetallic elements 48 and 46 respectively. To this end, the bimetallic strips may be provided with integral heaters. Such bimetallic strips are available from Technar, Inc. of Arcadia, Calif. In a successful application of the present invention, bimetallic elements obtained from Technar and listed by Technar as their part number 75006B040 were successfully utilized to raise and lower a tone arm as described above.

Thus, in accordance with the above, the aforementioned objects are effectively attained.

Having thus described the invention, what is claimed is:

1. In a phonograph turntable of the type comprising: a frame; a record supporting disc defining a generally horizontal plane affixed to said frame and mounted for rotation about a central axis; a tone arm having a first end carrying a cartridge assembly and a second end pivotally mounted to said frame for arcuate movement of said first end toward and away from said central axis and vertical movement toward and away from the plane of said disc; the improvement comprising: a post mounted to said frame for vertical movement beneath said tone arm, said post includes a top end and a horizontal cradle mounted to said top end, said cradle being dimensioned so that portions underlie said tone arm point as said tone arm first end moves from a first position off said record disc to a second position substantially adjacent said central axis, a bimetallic element for directly moving said post vertically having one end fixedly connected to said frame and a free end abutting said post, a heating element positioned adjacent to said bimetallic element, and means for connecting said heating element to a power source whereby upon heating of said element said bimetallic element deflects causing said post to shift vertically at a controlled rate in response to the change of temperature of said element.

2. The invention in accordance with claim 1 wherein said post is vertically aligned with a point on said tone arm proximal said tone arm second end.

3. The invention in accordance with claim 1 wherein said bimetallic element is oriented so that upon heating of said element said post moves vertically downwardly so as to disengage from contact with said tone arm point and upon cooling of said element said post moves vertically upwardly so as to engage said tone arm point and lift said tone arm first end above said horizontal plane.

* * * * *